Figure 1:
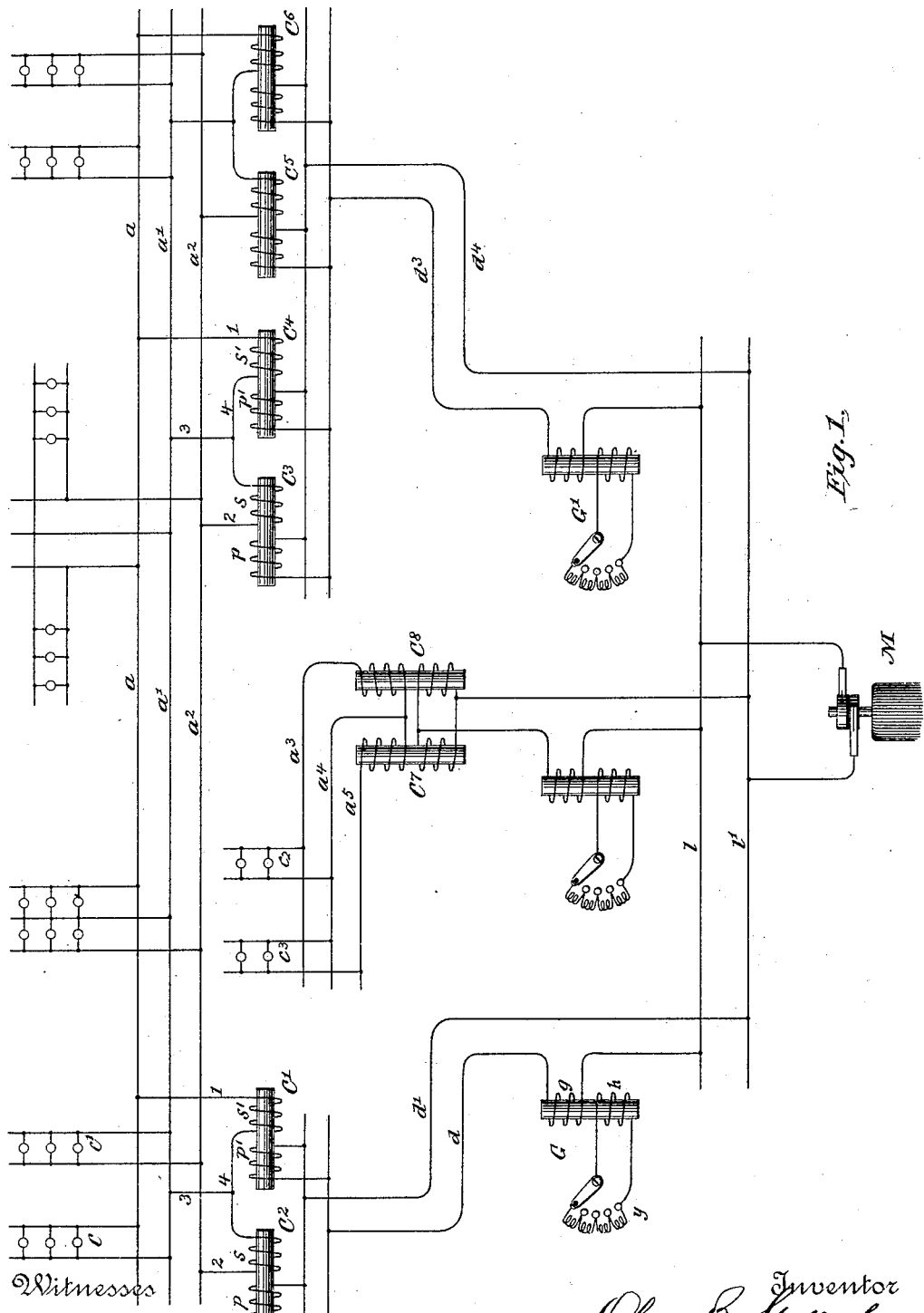

(No Model.) 2 Sheets—Sheet 1.
O. B. SHALLENBERGER.
SYSTEM OF ELECTRICAL DISTRIBUTION.
No. 550,355. Patented Nov. 26, 1895.

Witnesses
Geo. W. Breck
Carrie E. Ashley

Inventor
Oliver B. Shallenberger
By his Attorneys
Pope Edgecomb (No Model.) 2 Sheets—Sheet 2.
O. B. SHALLENBERGER.
SYSTEM OF ELECTRICAL DISTRIBUTION.
No. 550,355. Patented Nov. 26, 1895.
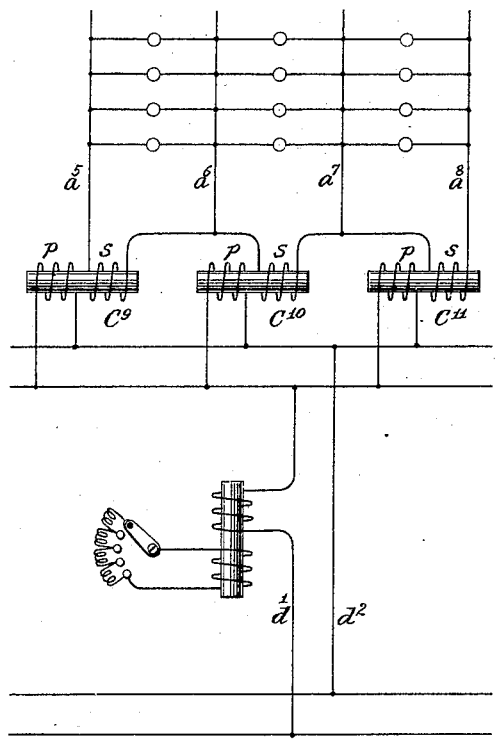
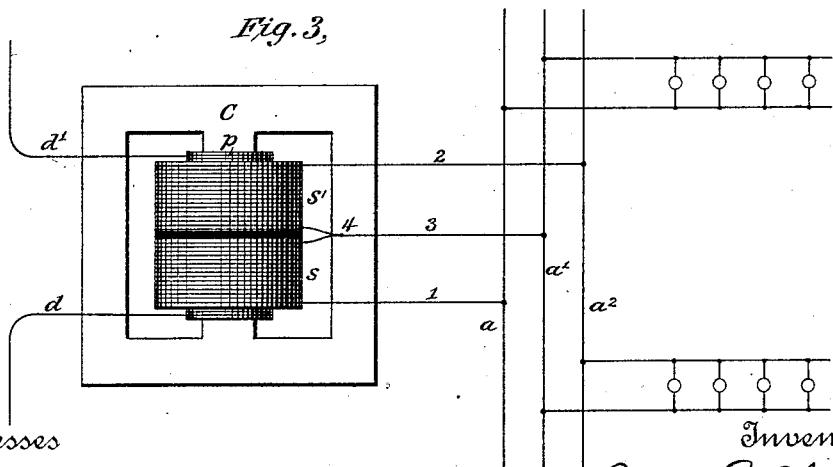

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

SYSTEM OF ELECTRICAL DISTRIBUTION.

SPECIFICATION forming part of Letters Patent No. 550,355, dated November 26, 1895.

Application filed October 12, 1886. Serial No. 215,993. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Systems of Electrical Distribution, of which the following is a specification.

The invention relates especially to the class of circuits and apparatus employed for utilizing alternating electric currents for electric lighting and similar purposes.

It is customary to supply an alternating current from a generator of suitable character and conduct it through one or more pairs of leads or feeders to points near where it is to be utilized and there convert it into a similar current of different potential. This converted current is then delivered upon main conductors and employed in operating suitable translating devices, such, for instance, as incandescent electric lights.

The object of this invention is to make it possible to extend the secondary conductors to greater distances from the converter-stations, and thus reduce the number of such stations and the feeders required, and to do this without increasing the size of the main conductors to an undesirable extent. To accomplish this the converters are grouped and connected in the system in a peculiar manner, as will be described in connection with the accompanying drawings, in which—

Figure 1 illustrates the general organization of apparatus in a diagrammatic form, and Fig. 2 illustrates an extension of the system. Fig. 3 illustrates a modification.

Referring to Fig. 1, M represents a suitable source of alternating or intermittent electric currents, and it may be either a single generator or a group of the same. One pole of the source is connected with the conductor 1 and the other with the corresponding conductor $1'$. These two conductors represent merely the respective poles of the generator. Two induction-coils or electric converters $C'$ and $C^2$ have their respective primary coils $p$ and $p'$ connected in multiple arc with these conductors by leads or supply-conductors $d$ and $d'$. The secondary coils $s$ and $s'$ of these two converters are connected in series with each other. The two terminals are then connected by conductors 1 and 2, respectively, with two main conductors $a$ and $a^2$ of a three-wire system. The third or neutral conductor $a'$ is connected by a conductor 3 with the conductor 4, joining the two coils $s$ and $s'$. The translating devices $c$ and $c'$ are connected in circuit between the conductors leading from the mains $a$, $a'$, and $a^2$ in the usual manner. When an equal number of lamps are on both sides of the system, no current passes through the neutral wire $a'$ nor the conductor 3, leading thereto. If, now, all the lights upon one side of the system—those, for instance, between the conductors $a$ and $a'$—should be turned off, while all those between the conductors $a'$ and $a^2$ remained in circuit, then the secondary coil $s$ would still supply the current necessary to operate the latter devices, its operation not being affected to any practical extent by the removal of the circuit connections of the secondary coil $s'$. If, instead of withdrawing all the translating devices $c$, only a portion were withdrawn, then the excess of current necessary to operate the devices $c'$ would be supplied through the neutral conductor 3.

It is desirable in extended systems that the currents should be supplied to the mains $a$ $a'$ $a^2$ at different points along their lengths, as thereby the potential is more readily equalized throughout the system. Other converters arranged in pair $C^3$ $C^4$ and $C^5$ $C^6$ may therefore be placed at the proper points. These have their primary coils in this instance all included in multiple-arc circuit with supply conductors or leads $d^3$ $d^4$, which are derived from the conductors 1 $1'$. The secondary coils of the two pairs are connected with the mains $a$, $a'$, and $a^2$ in the manner described with reference to the converters C and $C'$. Now as it may be desired to raise or lower the potential toward either end of the mains without varying that existing at the other, resistances are placed in the supply conductors or leads $d$ and $d^3$, and by varying the amount of resistance thus in circuit the potential at the terminal of the corresponding primaries may be varied. A convenient form of resistance consists of an induction coil or converter G, having its primary coil $g$ in the conductor $d$, and the terminals of the secondary coil $h$ connected through an adjustable resistance $y$. By adjusting the resistance in the secondary the potential at the terminals of the primary coil may be varied. A similar resistance device G' is inserted in the lead $d^3$.

An entirely independent system of translating devices $c^2$ $c^3$ may be included in circuit between conductors $a^3$, $a^4$, and $a^5$, supplied from converters $C^7$ and $C^8$. These have their primary coils connected in multiple arc with the conductors 1 and 1' in the manner described with reference to the other converters.

It will be noticed that thus far the system has been described in connection with the three-wire system; but the number of wires may be indefinitely extended without material change. In Fig. 2 there is shown an organization in which four wires $a^5$, $a^6$, $a^7$, and $a^8$ are employed. These are supplied by three converters $C^9$ $C^{10}$ $C^{11}$. The secondaries of these coils are included between the respective wires $a^5$ $a^6$, $a^6$ $a^7$, $a^7$ $a^8$, being connected in series. The primary coils are connected in multiple arc with the leads $d$ and $d'$. The operation of this organization is similar to that already described.

Instead of having two distinct converters C' and $C^2$, the construction shown in Fig. 3 may be adopted. In this instance a single primary coil $p$ is placed upon the core $c$ and connected in circuit with the conductors $d$ and $d'$. The secondary coil is constructed in two sections $s$ and $s'$. A single continuous conductor constitutes these two sections, and the middle point 4 is connected by the conductor 3 with the neutral wire $a'$. The outer terminals are connected by the conductors 1 and 2 with the lines $a$ and $a^2$, respectively. The regulation secured is similar to the case when two separate converters are employed. Its working depends upon the fact that the distribution of potential on a converter-coil under constant electromotive force is independent of the resistance in circuit between any two points within its working limits. The working limits are those within which the resistance of the coil forms an inappreciable part of the total resistance of the work circuit.

I claim as my invention—

1. The combination with a three-wire system of translating devices, of electric converters consisting of stationary bodies of inductive material and stationary primary and secondary coils of insulated wire, such converters having their secondary coils connected in series with each other, their free terminals being respectively connected with the positive and negative wires of the system and their remaining terminals with the neutral wire, and a source of alternating or intermittent currents of electricity with which the primary coils are connected in multiple arc.

2. The combination of a three-wire system of electrical distribution, two converters each consisting of a stationary body of inductive material and stationary primary and secondary conductors applied thereto, such converters having their secondary coils connected in series with each other and with the positive and negative conductors, a connection from the neutral conductor with the terminals of the secondary coils and means for transmitting alternate or intermittent electric currents through the primary coils.

3. In a system of electrical distribution, the combination with a source of alternating or intermittent currents, of supply conductors connected therewith in multiple arc and one or more groups of electric converters having their primary coils connected in multiple arc with said supply conductors and their secondary coils connected in series with each other and with the main conductors of the system, a third or neutral conductor connected with a neutral point in the group or groups of converters and translating devices connected between the neutral conductor and each supply conductor, substantially as described.

4. The combination with three conductors, of the translating devices included in multiple arc between one of the conductors and the other two conductors, a converter consisting of a stationary mass of soft-iron and stationary primary and secondary coils applied thereto electrical connections between the terminals of the secondary coil and said two conductors respectively, a connection between the remaining conductor and an intermediate point in the secondary coil, and a source of alternating or intermittent electric currents supplying the primary coil of the converter.

In testimony whereof I have hereunto subscribed my name this 28th day of September, A. D. 1886.

OLIVER B. SHALLENBERGER.

Witnesses:
A. L. REINMANN,
W. B. CORWIN.